March 25, 1952

G. C. DEVOL 2,590,091

MAGNETIC PROCESS CONTROL

Filed April 3, 1946

*INVENTOR.*
GEORGE C. DEVOL
BY
*Paul S. Martin*
ATTY.

March 25, 1952 G. C. DEVOL 2,590,091
MAGNETIC PROCESS CONTROL
Filed April 3, 1946 2 SHEETS—SHEET 2

INVENTOR.
GEORGE C. DEVOL
BY
ATTY.

Patented Mar. 25, 1952

2,590,091

UNITED STATES PATENT OFFICE 2,590,091

MAGNETIC PROCESS CONTROL

George C. Devol, Greenwich, Conn., assignor to Remington Rand Inc., New York, N. Y., a corporation of Delaware Application April 3, 1946, Serial No. 659,223

23 Claims. (Cl. 318—18)

This invention relates to a system for controlling the operation of a wide variety of different devices, such as machine tools, traffic lights, and the mechanisms for effecting the steps in a process. It aims at providing new and improved means for establishing an arbitrary, operational time-sequence, and for this purpose presents advantages over mechanical cams and photo-electric devices heretofore in similar use.

Apparatus embodying my invention includes a sensing element, a controlling element having magnetically different parts, means for causing relative movement between those elements, and a detector differently responsive to the coaction of the sensing means with the magnetically different parts of the controlling element. A source of sustained or varying magneto-motive force or combination of magneto-motive forces is contained in the sensing element or in the controlling element, or in both. The detector is responsive to the effect of the magneto-motive force or forces in the flux path linking the sensing element and that portion of the controlling element which is opposite the sensing element at any given time. The resulting control will vary with time in dependence on changed detector output as dissimilar portions of the controlling element are brought into apposition with the sensing element. Significantly, the control effected by the detector depends not on the rate-of-change in the interaction between the controlling element and the sensing element during their relative travel, but on the actual change in that interaction. The nature of the control effected does not depend on the rate of relative travel and would be sustained even were the travel interrupted.

The controlling element interacts with the sensing element in either of two fundamental ways, which in certain embodiments of the invention are indistinguishable. In one embodiment the controlling element is of magnetic material, the successively sensed portions of which are or may be magnetized differently and are of uniform cross-section. In another embodiment the successively sensed portions of the controlling element are of magnetic material of varying cross-section, and are magnetized uniformly or are unmagnetized. For convenience, the differences of either type between successive parts of the controlling element are termed magnetic differences.

The detector is arranged in different ways to produce various desired controls. One form of controlling element has magnetic differences along an invariable sensing path, and these differences cause the desired control by varying the detector output. In another form the controlling member contains an arbitrary pattern or contour which is magnetically uniform along the contour but which contrasts with the material adjacent the outline. The magnetic differences which cause changing detector output during the relative travel of the sensing and controlling elements generally along the contour are utilized to control a servo system which displaces the sensing element relatively toward the outline so as to maintain uniform detector output. In this system the mechanical output of the servo motor is relied upon for effecting the desired external control.

In that aspect of the invention having a regular, invariable sensing path, that form of controlling element is preferred which has D.-C. magnetization at critical portions of the path. Apparatus incorporating such a controlling element may be combined to great advantage with equipment where that element must be in a remote or inaccessable location and where quick changes of the cycle may be required. Unlike known controls, the control provided by my invention can be readily obliterated and it can be quickly renewed to meet changed arbitrary requirements.

The invention and further features of novelty will be better appreciated from the following detailed description of a few specific embodiments shown in the accompanying drawings, in which.

Figure 1:
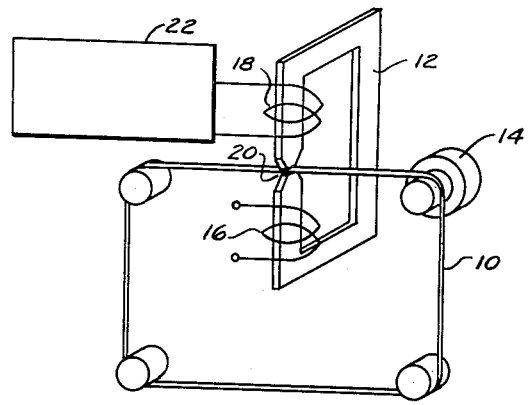
Figure 1 is a diagrammatic view of an elemental form of the invention.
Figure 3:
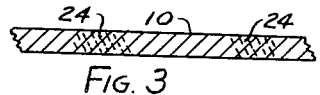
Figure 3 is a sectional view of a preferred type of controlling element, the section taken along the control path.

In Figure 1 there is shown an elemental form of the invention. Endless steel tape 10, appropriately supported on pulleys, is moved through the air gap of "C" shaped core 12 by means of motor 14. When coil 16 surrounding core 12 is excited from an A.-C. source, different voltages will appear in coil 18, which also surrounds core 12, by virtue of the mutual inductance of the coils. The voltage differences depend on the magnetic reluctance or on the magnetization of the substance in gap 20 of core 12, and on the incremental permeability of the core. A certain voltage will be induced when a magnetically saturated part 24 (Figure 3) of tape 10 lies in gap 20. A higher voltage will be induced when an unmagnetized portion of tape 10 passes through gape 20. The voltage induced in coil 18 is amplified, rectified if necessary, and the electrical output differentials are applied to the load.

The A.-C. excitation of coil 16 should be of a relatively low intensity to avoid demagnetization of the saturated portions of tape 10. Coil 16 may consequently be energized at a high level (and preferably at a higher frequency) should it be desired to obliterate the magnetized control portions of tape 10. By switching coil 16 to an appropriate D.-C. source for critical time intervals while motor 14 feeds tape 10 at a uniform rate, a new arbitrary cycle may be established.

The control effected by means of the foregoing embodiment of the invention is ordinarily of an "on-off" nature. It is useful for controlling short cycles, such as traffic light sequences where the reestablishment of new timing sequences is frequently desired. For an extended sequence, a length of wire unwound from one reel and wound onto another can be used in place of the endless tape shown.

The foregoing embodiment relies on a change in mutual inductance of coils 16 and 18 for changing output as magnetic differences are successively introduced at gap 20. The result is the same whether a uniform tape variably magnetized is used (Figure 3) or the tape has various cross-sections of magnetic material, homogeneous as in Figure 5, or with a non-magnetic support as in Figure 4. The same result can also be realized in reliance on the changing self-inductance of coil 18 on core 12, by incorporating coil 18 in an A.-C. excited bridge and utilizing the unbalance changes that occur when magnetic differences are successively introduced at air gap 20. When using this bridge circuit, coil 16 can be connected in series with coil 18 or simply disconnected.

Figure 2:
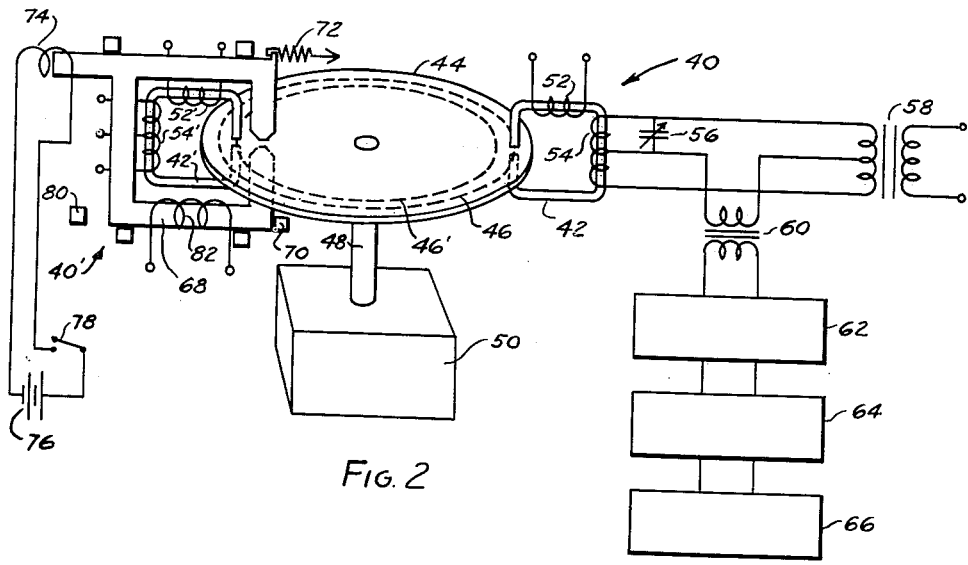
Figure 2 is a preferred form of the invention in which the relative motion between the sensing element and the controlling element is independent of the desired control.

In Figure 2 there is shown a second form of the invention. In this form, a number of pickup heads are arranged to sense a corresponding number of tracks on a disc, not only establishing a timing sequence thereby, but also determining the relative timing of multiple components in a system.

Plural pickup heads may be used to control, as an example, the valves which determine the proportions of multiple fluids feeding into each batch of a mixture. The relative arcuate extents of magnetization in the respective tracks control the proportions of the mixture. The rate of travel of the controlling element relative to the pickup heads is varied to adjust the total volume of each batch.

The several control tracks may equally well be arranged to control multiple motors or clutches in an automatic machine tool. In order to prepare the magnetic control element for use in this application, the machine tool is cycled manually to produce a given workpiece, at the same time energizing the magnetizing control related to the clutch or motor which, in automatic operation, would perform that function. Having operated a tool through an idle stroke, such as displacing the tool carriage of a lathe preparatory to calipering the work, the unnecessary magnetizing control may be eradicated by simultaneously energizing the magnetizing head with obliterating alternating current and reversing the travel of the magnetic control. The same procedure may be followed to correct errors in the controlling element, and to establish new control sequences. When a single perfect magnetized controlling element has been formed, it may be arranged to control the cycle of multiple automatic machines like that which was manually cycled in its preparation.

In Figure 2, plural pickup heads 40 and 40' include cores 42 and 42' of a highly permeable magnetic material, such as mumetal, and shaped to constitute a closed magnetic circuit except for a gap for receiving the magnetic controlling element. In this embodiment of the invention, the controlling element is in the form of a disc 44 in which there are incorporated plural endless control tracks 46, 46', etc., one for each pickup head 40, 40', etc. Disc 44 is carried by shaft 48 which is rotated by means of the schematically represented motor and reduction gearing unit 50, which should include reversing and speed controls not shown.

On cores 42 and 42' there are center-tapped windings 54 and 54', the impedances of the halves of which are made equal at the excitation frequency. To compensate for secondary errors in matching the coil halves, a shunt trimming impedance may be used, such as variable condenser 56. The two halves of each winding 54 and 54' are a A.-C. driven by center-tapped transformer 58 at a frequency equal to or higher than conventional power frequencies. Those halves are so connected in series that their separate responses due to a strong magnetic field introduced in the gap of core 42 or 42' will be additive in the center-tap circuit. That circuit in the present case is a transformer 60 connected at its primary between the center-tap of coil 54 and the center-tap in the secondary of transformer 58. The cross-sectional dimensions of cores 42 and 42' are made small compared with the magnetic circuit length; and when this is done and sufficient A.-C. drive is applied in the presence of a unidirectional magnetomotive force in the core, there will be a strong second harmonic voltage developed across the primary of transformer 60. Other even harmonics will also be prominent but the output signal-to-noise ratio is greatly enhanced when only the strongest harmonic, the second, is filtered from the others. A second harmonic filter and amplifier 62 is connected to receive its input from the secondary of transformer 60 and is connected at its output side to a demodulator, or combined rectifier and low-pass filter 64. The function of unit 64 is to suppress the high frequency components due to the A.-C. excitation and to extract the relatively slower changes due to the magnetic condition of the control tracks. The electrical output of unit 64 may be utilized to control or even operate load 66.

Each of the sensing elements or pickup heads 40, 40', etc., will naturally have associated with it some form of detector or analyzer 56—64 which will determine its magnetic condition as affected by the control element 44.

In applications described above, the detected output is utilized to effect "on-off" control of electromechanical apparatus, such as valves, relays, etc. Additionally, varying degrees of response of the pickup head can be obtained when associated with an appropriate controlling element to effect various degrees of control. Thus, in theatre lighting a dimmer can be variably operated by an electromagnet and restored by a spring under control of the foregoing apparatus.

It is sometimes necessary to effect three levels of control, rather than all degrees of control or simply an "on-off" control. This is attainable in accordance with the present invention by utilizing opposite polarities of magnetization on the controlling element, as well as unmagnetized area. Coil 52 on core 42 is then biased with direct current to counterbalance the effect in the core of one polarity of magnetization, to yield zero output at transformer 60. With unmagnetized portions of track 46 opposite core 42 there is a second level of output at transformer 60 due to the bias current; and with the other polarity of magnetization in track 46, augmented by the D.-C. bias, a third level of output is to be expected at transformer 60.

Figure 4:
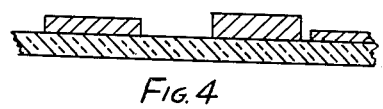
Figures 4 and 5 are similar views of alternative forms of controlling elements.
Figure 5:
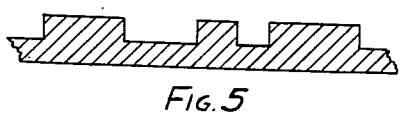

A permanently formed control track of either type shown in Figures 4 and 5 can be used in the apparatus of Figure 2. The track may be magnetized or not; and where it is unmagnetized, use of the D.-C. bias coil 52 with the second-harmonic type of detector will be found meritorious.

With the type of sensing element and detector shown in Figure 2, where practical operation is dependent on a significant degree of A.-C. core saturation, it will be found that means in addition to the sensing head are required for obliterating and for remagnetizing control tracks 46. For this purpose an additional core and coil are provided, with means to shift it into the effective position of the sensing core and coil. Thus the entire sensing head 40' is shown mounted for sliding radially of disc 44 as a unit with heavy core 68'. The assembly is normally urged against stop 70 by spring 72 to maintain the jaws of core 42' opposite track 46'. Solenoid 74, energized by D.-C. source 76 through switch 78, may be operated to shift the combined obliterating, magnetizing, and sensing head as a unit, moving core 68' against stop 80 and thereby positioning the jaws of core 68' opposite track 46'. Coil 82, embracing core 68', may then be A.-C. energized to establish a relatively high number of ampere-turns, preferably at a high frequency for obliterating the previous magnetization. Coil 82 is subsequently energized with D.-C. (of appropriate polarity if this is significant) at the necessary intervals during the travel of disc 44 to establish a new control sequence. If an error is made, the rotation of drive 50 may be reversed and coil 82 concurrently connected to the A.-C. source for the necessary interval; and forward drive and controlled magnetization may then be resumed.

The obliterating and magnetizing components have been omitted from Figure 2 in showing sensing head 40 in the interest of clarity; but it is to be understood that an obliterating and remagnetizing head will usually complement each sensing head.

Where a control track of the type shown in Figure 4 is used wherein the magnetic portions are of magnetic ink, the control sequence can be altered by removing the ink with a solvent-soaked roller and inscribing new control portions.

Figure 6:
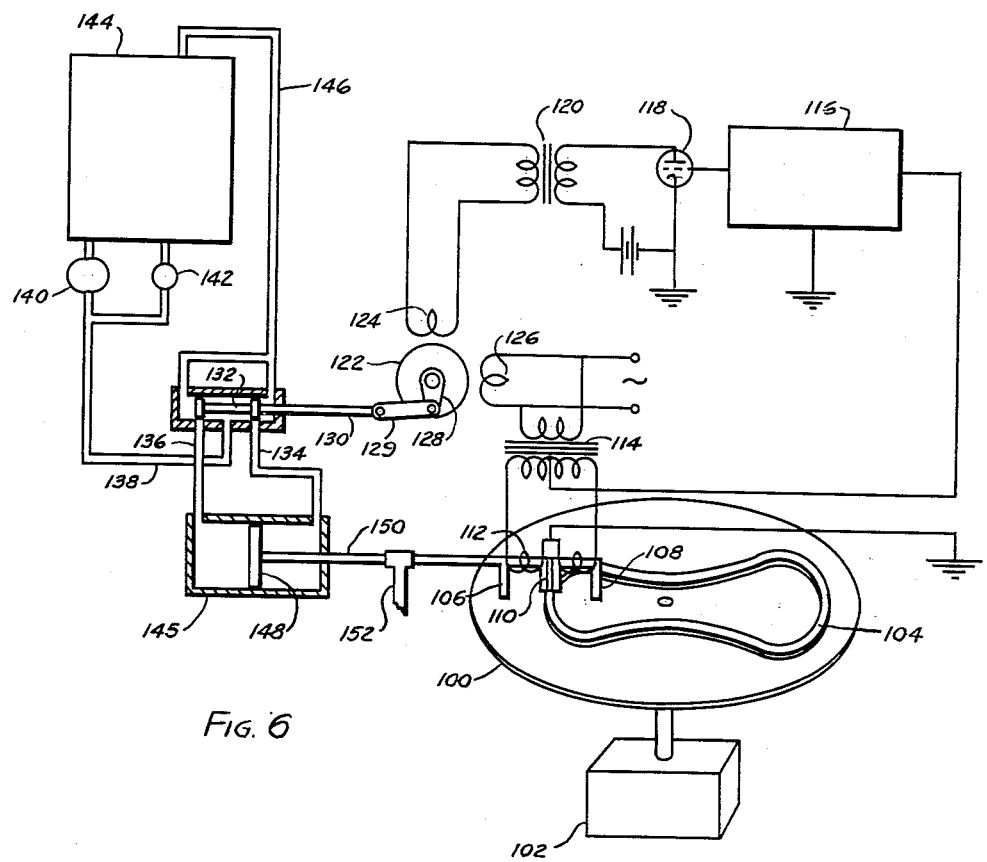
Figure 6 is a combined diagrammatic showing and circuit of that form of the invention in which the displacements of the sensing element in following an arbitrarily contoured controlling element are utilized to effect the desired control.

In the form of the invention shown in Figure 6 the output of the detector is, as in other forms, dependent on the interaction between a sensing head and a magnetic controlling element. The detector output in this form is utilized to control a servomotor for displacing the sensing head to track a magnetic template or pattern in such direction as to maintain sensibly constant detector output. The mechanical output of the servomotor is also used for effecting external control or external drive.

Figure 7:
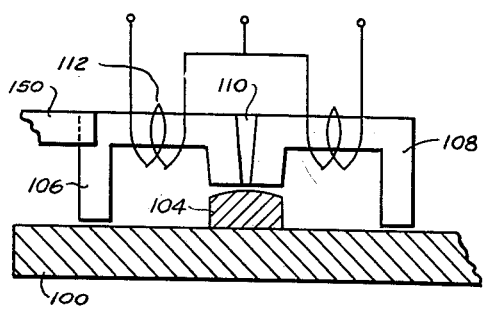
Figure 7 is an enlarged view of the controlling element of Figure 6 shown in section with the sensing element.

The specific form illustrated in Figure 6 includes a soft iron disc 100 supported and rotated at a uniform rate by means of motor and reduction gearing unit 102. Secured to the upper surface of disc 100 is an arbitrarily contoured loop 104 of soft iron. Its cross-section is generally rectangular so that it may rest flat on disc 100, but its upper surface is somewhat convex (Figure 7).

U shaped magnetic cores 106 and 108 are inverted and secured to each other to form a double U with a magnetic insulator 110 between the adjacent arms. The double U is arranged with its center arm over loop 104, this arm being shortened so that the outer arms may be close to disc 100. A center-tapped coil 112 embraces cores 106 and 108 and is A.-C. excited by means of center-tapped transformer 114.

The transformer secondary and coil 112 constitute a balanced bridge when magnetic insulator 110 is aligned with the median of loop 104. Should insulator 110 be displaced laterally of loop 104, there would be a change in impedance, resulting in a sharp phase shift in the output of the bridge. This output is optionally filtered in phase-compensated preamplifier 116, and applied by amplifier 118 through transformer 120 to one phase 124 of two-phase motor 122. A second phase 126 of motor 122 is energized from the same source as that which is used to energize transformer 114.

Motor 122 can in some cases be utilized to shift the sensing head as required to trace loop 104 during the rotation of disc 100. But because its mechanical output (for a reasonable size of motor 122 and control source of supply 116, 118, 120) is inadequate for most purposes, motor 122 is used in the device illustrated in Figure 6 as a phase-sensitive device for controlling the valve of a hydraulic motor which in turn drives both the sensing head and the external load as determined by the contour of loop 104.

Motor 122 is connected through a suitable linkage 128, 129, 130 to the slide 132 of a fluid valve 134. When slide 132 is displaced in one direction or another from center, it admits fluid under pressure from line 138 as supplied by pump 140 to one end or the other of fluid motor 145. The fluid from the low pressure side of motor 145 is returned through line 134 or 136 to sump 144 by way of line 146. When slide 132 is centered, the pressure built up by pump 140 is bypassed by relief valve 142, the fluid returning to sump 144.

Piston 148 of fluid motor 145 has a rod 150 which not only displaces the sensing head radially of disc 100 to the extent required by the contour of loop 104, but additionally displaces arm 152, which is the takeoff for controlling or driving the external load. In common with other servo systems, it will be understood that some form of oscillation damper is to be incorporated in the electrical or hydraulic portion of the organization; and limited damping action may be realized through careful design of the center arm of the double U and of the cross-sectional shape of wire loop 104.

Arm 152 can be utilized to operate the variable control of an electrical furnace or of a light-dimming system; or (as a further example) it can determine the cutting rate of a machine tool directly or through a pantograph linkage.

A pair of similar pickup heads and servo systems can be arranged mutually at right angles and properly supported so that a composite head of the mutually perpendicular double U's are shifted along a trace such as 104. Alternatively the composite head may be fixed, and the pattern may be shifted by the servo actuators. Such systems eliminate drive unit 192. Either form is useful for controlling a flame cutter or other tool, the function of which is to duplicate the shape of the control pattern.

Other forms of control pattern than that illustrated in Figure 6 may replace that shown and described. For example, a sheet-iron cutout can be used; or a trace magnetized perpendicular to the face of disc 100 (see Figure 3). Each of these alternatives involves judicious modification of the pickup head or a substitution of another form such as is shown in Figures 1 and 2.

What I claim is:

1. A controlling device comprising a controlling element having a pattern of magnetically different parts, a sensing element, means distinct from and in addition to said controlling element to energize said sensing element periodically, driving means to cause said sensing element to coact with any particular one of said parts at any particular time, and a detector differently responsive to the coaction of said different parts with the sensing element.

2. Apparatus according to claim 1 wherein said driving means causes said sensing element to travel relatively along a predetermined path including said magnetically different parts.

3. Apparatus according to claim 1 including a servomotor controlled by said detector for moving said sensing means at an angle to said relative travel and for correspondingly moving an external load.

4. A device for operating electrical apparatus comprising a controlling element having a pattern of magnetically different parts, means differently responsive to said magnetically different parts for operating said apparatus, said means including a sensing element and means distinct from and in addition to said controlling element and any effect of said controlling element for exciting said sensing element with varying current, and a drive establishing coaction of said sensing element relative to any particular predetermined one of said parts at any particular time.

5. A device according to claim 4 in which certain of said parts are permanently magnetized.

6. The method of providing an automatic equipment-control sequence comprising the steps of magnetizing a control member in a predetermined pattern so as to be magnetically different at different parts corresponding to the required control sequence, moving said member past a sensing device of the undulatory current type, and exciting said device at a frequency that is high relative to the highest rate of traverse of the different parts past the sensing device.

7. A device for operating electrical apparatus, including a controlling element having a pattern of magnetically different portions, detecting means differently responsive to said different portions, said detecting means having a sensing element having a magnetic core in apposition to said controlling element and means separate and distinct from said controlling element and of the motion thereof for producing repetitive magnetic variations in said core, and means for bringing a definite predetermined portion of said controlling element into coactive relationship with said sensing element at any given time.

8. A load controlling device including a variously magnetized control element, means for sensing and detecting the magnetization of a local area thereof, said sensing and detecting means including a core for coaction with said control element and means distinct and independent of said control element for repetitively varying the magnetic condition of said core, and means for bringing a definite predetermined portion of said control element into cooperation with said core at any particular time.

9. A control device including a multiple-track controlling element, each track of which contains portions of differing magnetic characteristics, means associated with each track responsive to said magnetic characteristics for controlling a respective apparatus component, said responsive means including means separate and distinct from the controlling element, and from the motion thereof, causing regularly repetitive magnetic variations in the portion thereof that coacts with said associated track, and means establishing coaction of a predetermined portion of said controlling element with said responsive means.

10. Apparatus for operating an electrical device, comprising a controlling element having a control track of magnetically different portions, combined sensing and detecting means differently responsive to differently magnetized portions for controlling said device, said combined means having a coil and core in intimate magnetic relationship with said controlling element and alternating current exciting means for said coil separate and distinct from said controlling element or the motion thereof, and means to locate particular portions of said controlling element in cooperative relationship with said core in definite, predetermined succession.

11. Apparatus for operating electrical equipment comprising a track of magnetic material only portions of which are magnetized, means differently responsive to magnetized and unmagnetized portions for controlling said equipment, said means including a saturable-core pickup head and means for periodically varying the magnetization thereof, and a mechanical drive for positioning successive portions of said track opposite said pickup head.

12. Apparatus for controlling an electrical device comprising a control track of magnetic material having magnetized portions, means including a saturable-core pickup head and means for periodically varying the magnetization thereof for controlling said device according to a predetermined time sequence, a mechanical drive for moving said pickup head relatively along said track, an alternative head for modifying the magnetization of said track to establish a new time sequence, and means for interchanging said pickup head and said alternative head with respect to said track.

13. A program control comprising, in combination, a track having successive magnetically different portions, a core adjacent to the track, a drive for causing relative motion between said core and said track along the latter, a source of regularly varying magneto-motive force for exciting said core, and means for detecting differences in the effect of said magneto-motive force on said core as different portions of said track are opposed to said core in succession.

14. A device for operating electrical apparatus comprising a control track of magnetic material having magnetized portions, means differently responsive to parts of different magnetization for operating said apparatus, said means including an alternating current excited sensing element and alternating-current exciting means for said sensing element distinct and independent of the control track and of the motion thereof, and means for moving said element relatively along said track in a predetermined time schedule.

15. A contour tracer including a body incorporating a magnetically distinctive contour, means differently responsive to magnetic differences including a sensing element including a magnetic core and means separate and distinct from said contour or the motion thereof for producing magnetic variations in said core, said core coacting with said contour, and an actuator controlled by said responsive means for maintaining said sensing element in predetermined proximity to said contour.

16. Apparatus for controlling a machine component comprising a magnetic pattern, a pickup head having a magnetic core and internal means repetitively varying the magnetic condition of said core, means for determining the response of the pickup head to the opposed portion of the pattern, a driver for moving the pickup head relatively along the surface of the pattern in one coordinate, and means for maintaining the pickup head adjacent the edge of the pattern by moving it in another coordinate relative to the pattern and for operating the machine component.

17. A pattern follower including a magnetic pattern, an alternating current excited coil having a magnetic core, means critically responsive to the coaction of the core with the contour outline, an actuator controlled by said responsive means for moving the core relatively toward the pattern outline, and other means for moving the core relatively along the pattern outline.

18. Apparatus for operating a machine component, comprising a coil having a magnetic core, an alternating current bridge including said coil in one of its arms, a magnetic contour, means for moving the core relatively along the contour, and an actuator for moving the core relatively toward the contour and for operating said machine component, the actuator being controlled by the output circuit of the bridge.

19. Apparatus for operating an electrical load, including a track of magnetic material only portions of which are magnetized, a sensing element located at a sensing position, means for moving said portions of said track past said sensing element according to a predetermined time schedule, and means separate and independent of said control element for introducing repetitive magnetic variations in said sensing element at a repetition rate that is high in relation to the rate of traverse of said portions past said sensing element.

20. Apparatus for operating an electrical load, including a track of magnetic material only portions of which are magnetized, a sensing element located at a sensing position, drive means enforcing definite predetermined sensing relationship of any particular portion of said track opposite said sensing element at any given time, and means producing a plurality of repetitive magnetic variations in said sensing element during the time that any particular one of said portions is in sensing relationship to said sensing element.

21. Apparatus for operating an electrical load, including a member embodying a track having discrete magnetized and unmagnetized areas, sensing means located at a sensing position including a saturable core oriented in sensing relation to said track, motive means establishing a predetermined sensing relation of one of said areas opposite said core at any particular time, and electrical exciting means varying the saturation of said core a plurality of times during the period that any one of said areas remains in sensing position.

22. A load controlling device in accordance with claim 8 wherein said control element embodies unmagnetized portions and portions of opposite polarities of magnetization.

23. A load controlling device in accordance with claim 8 including an electromagnet for modifying the magnetization of said control element at different areas as may be brought into cooperation therewith.

GEORGE C. DEVOL.

REFERENCES CITED

The following references are of record in the file of this patent:

UNITED STATES PATENTS

| Number | Name | Date |
|---|---|---|
| 900,392 | Kirkegaard | Oct. 6, 1908 |
| 1,959,804 | Wittkuhns et al. | May 22, 1934 |
| 1,988,458 | Minorsky | Jan. 22, 1935 |
| 1,998,939 | Mittag | Apr. 23, 1935 |
| 2,116,593 | Bouvier et al. | May 10, 1938 |
| 2,121,211 | Padva et al. | June 21, 1938 |
| 2,313,136 | Fischer | Mar. 9, 1943 |
| 2,363,336 | Keeler | Nov. 21, 1944 |
| 2,407,657 | Esval | Sept. 17, 1946 |
| 2,414,690 | Edwards | Jan. 21, 1947 |
| 2,423,440 | Neergaard | July 8, 1947 |
| 2,457,558 | Hornfeck | Dec. 28, 1948 |